(No Model.)

G. N. CLEMSON.
SAW.

No. 349,143.          Patented Sept. 14, 1886.

WITNESSES:
F. McArdle.
C. Sedgwick.

INVENTOR:
G. N. Clemson
BY Munn & Co.
ATTORNEYS.

UNITED STATES PATENT OFFICE.

GEORGE N. CLEMSON, OF MIDDLETOWN, NEW YORK.

SAW.

SPECIFICATION forming part of Letters Patent No. 349,143, dated September 14, 1886.

Application filed May 29, 1886. Serial No. 203,603. (No model.)

*To all whom it may concern:*

Be it known that I, GEORGE N. CLEMSON, of Middletown, county of Orange, and State of New York, have invented new and useful Improvements in Saws, of which the following is a specification, reference being had to the annexed drawings, forming a part thereof, in which—

Figure 1:
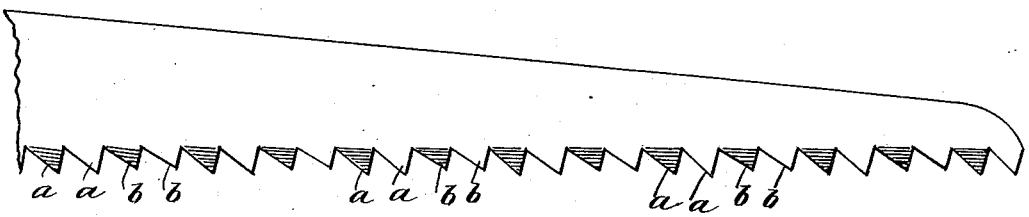
Figure 2:
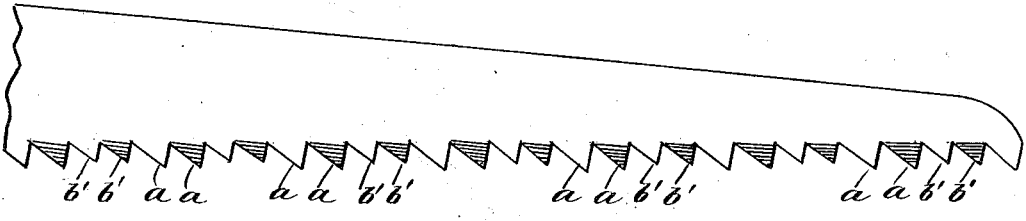

Figure 1 is a side elevation of one form of my improved saw. Fig. 2 is a side elevation of a modified form.

Similar letters of reference indicate corresponding parts in both figures of the drawings.

In ordinary saws, in which the teeth are all of the same length, a part of the cutting is done by each tooth; but sufficient pressure must be exerted by the user of the saw to bring all of the teeth into close contact with the work.

I have found by trial that a saw with a reduced number of teeth will cut more rapidly than the ordinary saw; but where wide spaces are left between the teeth the saw is apt to catch and tear the work.

The object of my invention is to provide a saw having long and short teeth, the long teeth being employed in cutting, and the short teeth being used as clearers and as a gage for the depth of the cut, and for preventing the saw from catching in and splintering the work.

In carrying out my invention I preferably make a saw with teeth of the ordinary description, but differing in length, and arrange the teeth in pairs, a pair of long teeth alternating with a pair of short teeth, both long and short teeth being set in the usual way, so that each pair of long teeth consists of one tooth set in a right-handed direction and another in a left-handed direction, to secure an equal cut at both sides of the saw. The shorter teeth are arranged in a similar manner, each pair consisting of one tooth set in one direction and another tooth set in the opposite direction.

To facilitate the manufacture of the saw, I preferably make the teeth of the same width, but differing in length, as shown in Fig. 1, pairs of long teeth $a$ alternating with pairs of short teeth $b$ throughout the entire length of the saw. I may in some instances make the saw, as shown in Fig. 2, with pairs of long teeth $a$ alternating with pairs of short and narrow teeth $b'$ throughout the length of the saw. The entire series of teeth in either form of saw are set in the same manner as the teeth in ordinary saws.

It will be observed that without close inspection a saw made according to my improvement will not appear to be different from an ordinary saw; but the prominence of alternating pairs of teeth will enable it to cut faster and with less exertion on the part of the user, while the intermediate pairs of short teeth will serve as a gage to the longer teeth, and will assist in clearing the kerf of sawdust.

In the ordinary cut-off handsaw, with teeth filed bevel or straight, the saw will cut across the grain of the wood, and will not with advantage cut with the grain of the wood, or rip, while my improved saw, with teeth filed either beveled or straight, will cut with the grain of the wood, or rip, and will cut off equally as well, thereby making one saw do the work now requiring two separate saws, and also making it unnecessary to bevel the teeth, thereby effecting a great saving in time and money, besides making it a simple matter to keep the saw in good working order.

Having thus described my invention, what I claim as new, and desire to secure by Letters Patent, is—

A saw provided with alternate pairs of long and short teeth, the teeth of each pair being set in opposite directions, substantially as herein shown and described.

GEORGE N. CLEMSON.

Witnesses:
CHARLES M. ELDER,
BARCLAY C. MONROE.